June 23, 1970  J. VAN DER WAL  3,516,363
CONVEYOR SYSTEM WITH PORTIONS OPERABLE AT DIFFERENT SPEEDS
Filed Jan. 24, 1968  3 Sheets-Sheet 1

INVENTOR.
JURJEN VAN DER WAL
BY
ATTORNEYS

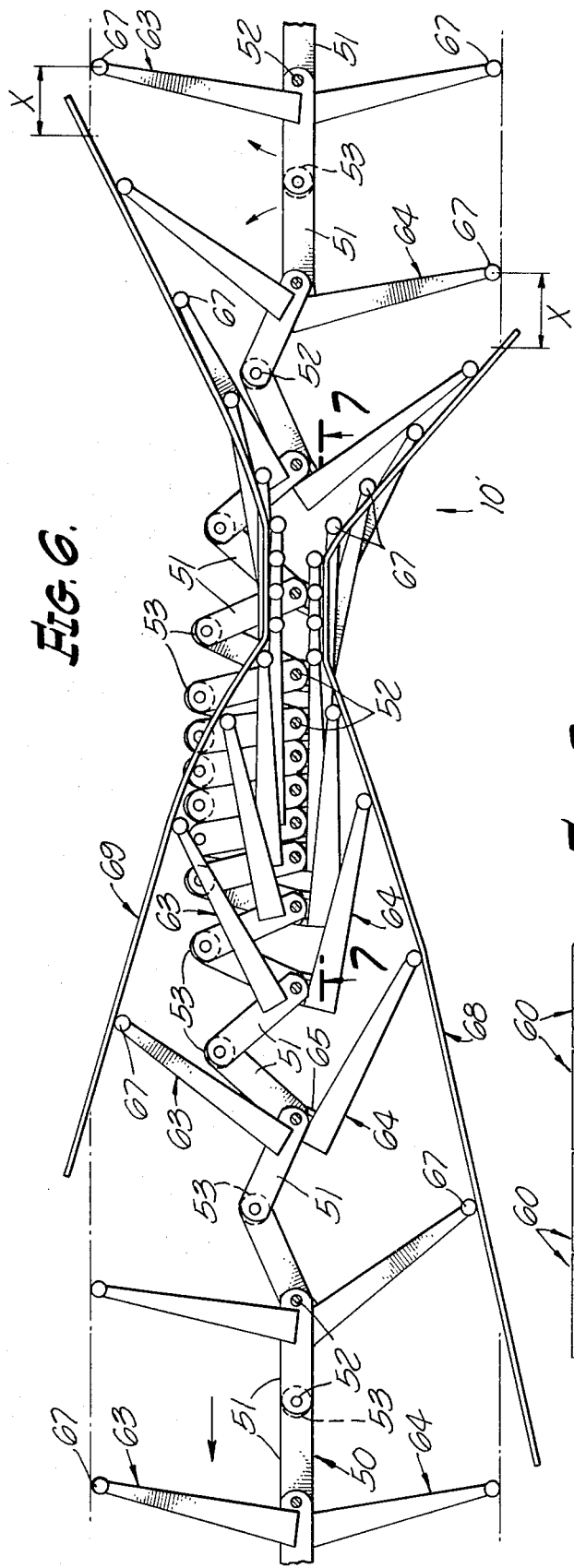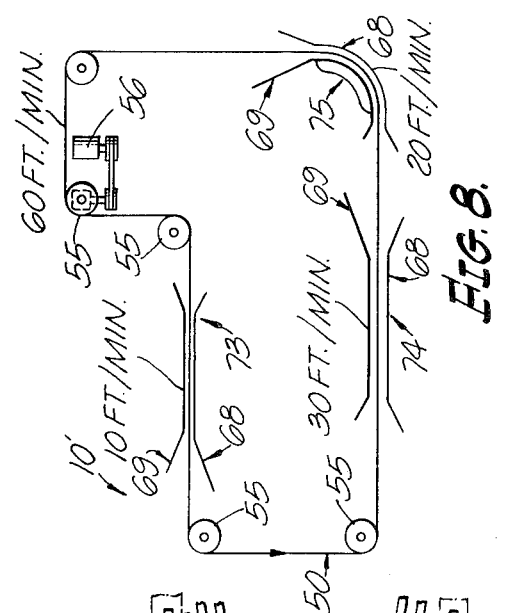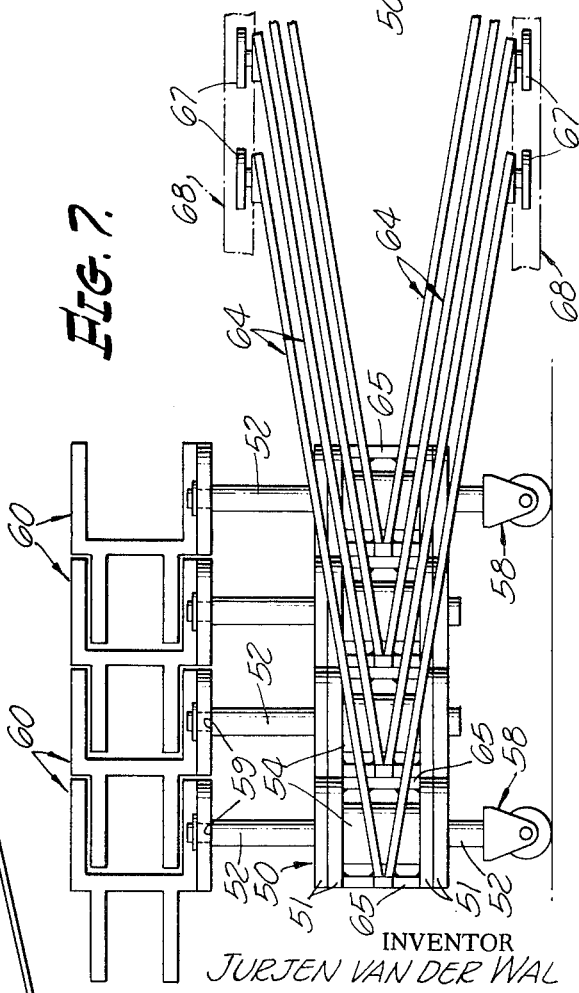

June 23, 1970  J. VAN DER WAL  3,516,363
CONVEYOR SYSTEM WITH PORTIONS OPERABLE AT DIFFERENT SPEEDS
Filed Jan. 24, 1968  3 Sheets-Sheet 3
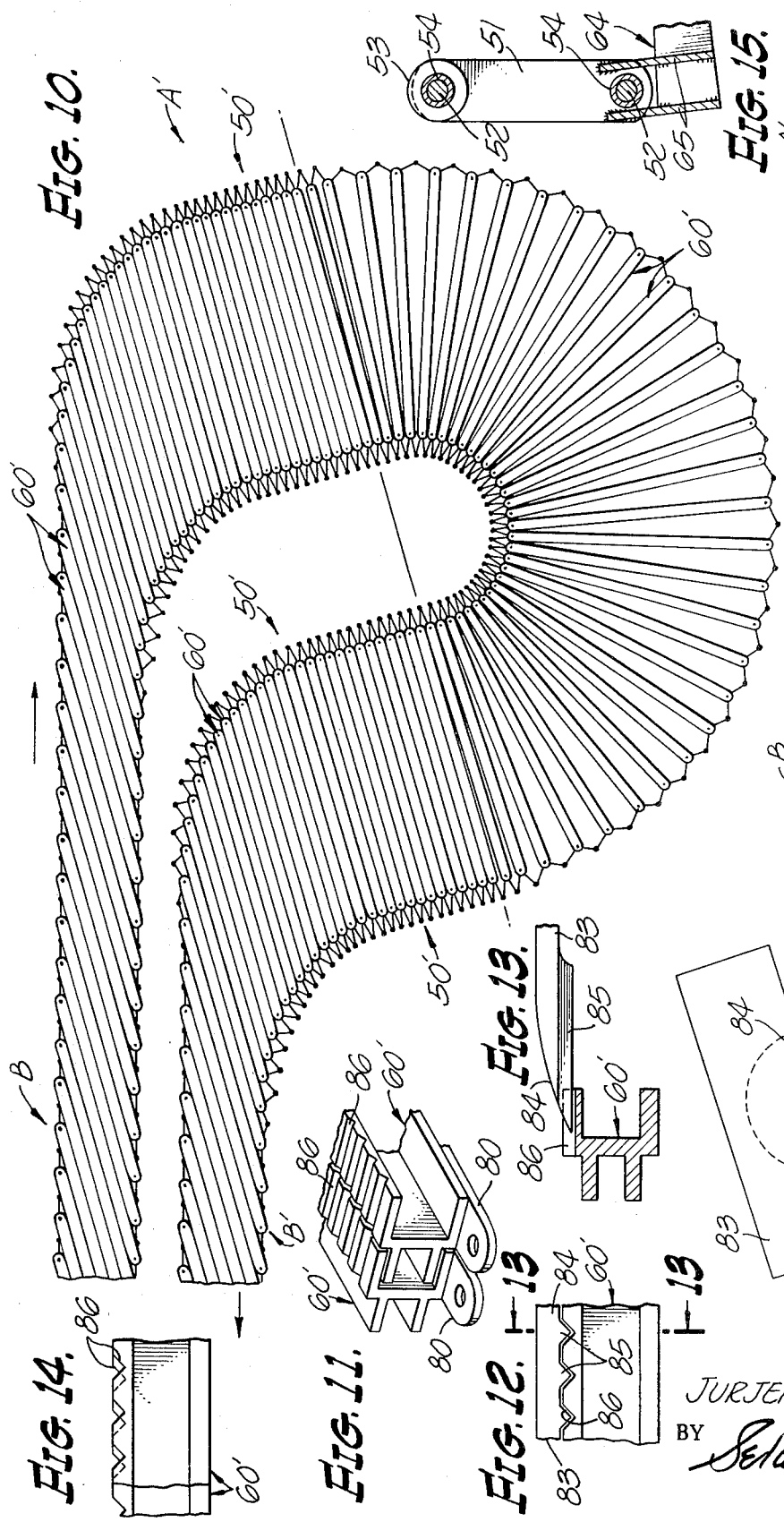
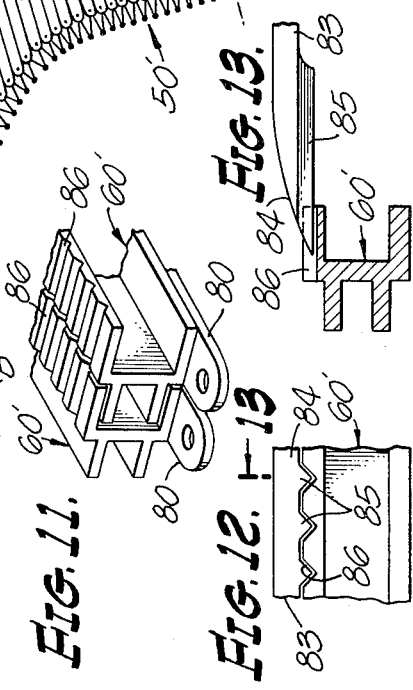
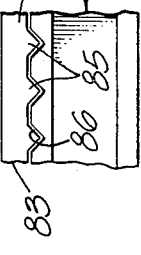
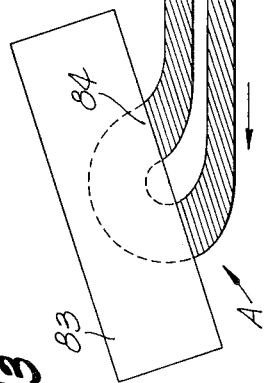
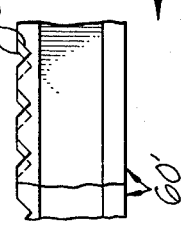
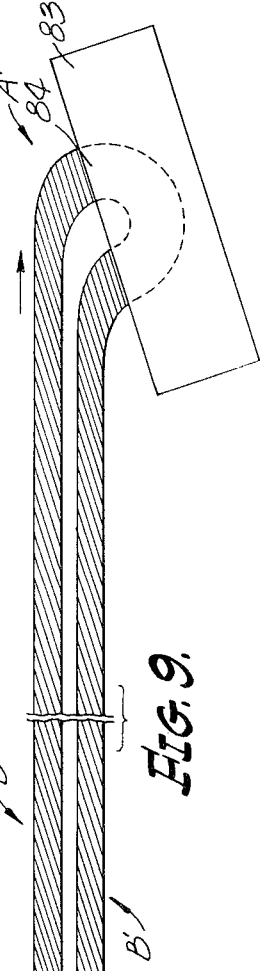
INVENTOR
JURJEN VAN DER WAL
BY
ATTORNEYS United States Patent Office 3,516,363
Patented June 23, 1970

3,516,363
CONVEYOR SYSTEM WITH PORTIONS OPERABLE AT DIFFERENT SPEEDS
Jurjen van der Wal, 12722 Colima Road,
La Mirada, Calif. 90638
Continuation-in-part of application Ser. No. 561,457,
June 29, 1966. This application Jan. 24, 1968, Ser.
No. 703,224
Int. Cl. B61k 1/00
U.S. Cl. 104—25
34 Claims

ABSTRACT OF THE DISCLOSURE

A transportation system having a single driving source operating at uniform speed and characterized by the fact that different portions of the system operate at substantially different speeds as, for example, a speed ratio of six to one. Loads may be transferred with complete safety at the slow speed portions and then delivered at high speed to a slow speed destination portion of the system. The load bearing surface of the system is designed to avoid gaps and relatively sliding overlapping members by resort to a unique expedient for skewing the long narrow load-carrying members. This system utilizes either a single link or two or more link chains of standard construction supplemented by simple additional components. All portions of the linkage assemblies are maintained under tension while being driven and speed variation is achieved through the use of rigid arms bearing against fixed cam surfaces arranged along the path of travel. A fixed loading platform preferably closely overlies the slow moving portions of the conveyor and includes comb means for expediting the transfer of loads onto and off from the slow moving portion.

---

This application is a continuation-in-part of my co-pending application for United States Letters Patent Ser. No. 561,457 filed June 29, 1966, now abandoned, entitled High Speed Conveyor with Portions Operable Simultaneously at High and Low Speeds.

This invention relates to conveyors and transportation systems, and more particularly to a unique conveyor system featuring a belt constructed for expansion and contraction under conditions such that one or more portions travel at a rate greatly in excess of other portions thereby making it feasible to load and unload at a safe lower speed and to transport the load being handled to its destination at high speed.

One of the long-standing limitations governing the design and operation of conveyor systems has been the maximum operational speed safely tolerable during either loading or unloading. Once the load is safely aboard the conveyor, a higher speed is readily tolerated and desirable. Prior designs proposed to satisfy this condition have not provided satisfactory and practicable modes of achieving differential travel rates utilizing a simply constructed, simply powered conveyor assembly avoiding the numerous problems associated with a variable speed conveyor.

It is possible and known to introduce time delay expedients in continuously operating conveyor systems effective to retard or speed up the operation of a limited portion of the conveyor within very narrow speed ranges. Examples of such expedients are to be found at return bends of certain known conveyors and applications where it is desirable to open up the space between load carrying cradles or cages to avoid interference with one another when making turns or for related purposes. The achievable change in travel speed made possible by these prior expedients is usually confined to a small fraction of the normal speed and is customarily possible only over a relatively short travel path.

It has also been proposed to provide a conveyor linkage having extendable and contractable sections each provided with its own source of power but these are subject to serious and vexatious problems owing to the difficulty of synchronizing the operating speeds of the several power sources. Unless the motors are operated in perfect synchronism a portion of the conveyor downstream from one or more motors is subject to pushing forces whereas one or more upstream portions are under tensile forces with the result that alternate sections of the system are in compression and in tension, respectively.

Another serious problem associated with prior designs is the fact that the spacing between adjacent load bearing members must vary as the speed changes. This introduces problems and presents hazards both to property and to persons in the vicinity of the equipment. In fact, such variable gaps in the load bearing surface prohibits the use of the equipment to carry passengers because of the ever-present and serious risks to life and limb.

Still another serious defect of prior systems is the highly objectionable limitations on the speed differential heretofore achievable.

It is, therefore, a primary purpose of the present invention to avoid the foregoing and other serious limitations of prior variable speed transportation systems. By the present invention there is provided a simple conveyor system utilizing a stretchable conveyor-like belt comprising a simple rugged and proven main linkage assembly equipped with simple components and cam means cooperating to expand or contract the chain automatically while passing one or more loading and unloading stations. Any desired length of this belt can be operated in contracted condition while another portion of any desired length can be operated in extended condition and at a materially higher travel speed. The different rates of travel are achieved by continuously expanding a length of contracted conveyor at the desired high travel rate. For example, if the contracted portion is traveling at 2 miles per hour and a selected length of this contracted conveyor is expanded at the ratio of 6 to 1, the portion of the conveyor leaving the contracted portion is traveling at a speed equal to the product of its contracted speed and this ratio, or 12 miles per hour. The expanded portion continues to travel at this faster rate so long as additional sections of the contracted conveyor continue to be expanded under the same conditions and so long as the contracted sections of the conveyor are advanced into the expanding operation.

Since it is usually desirable to discharge the load at the slow loading speed, this objective is easily accomplished by reversing the expanding operation just described immediately in advance of the unloading station. In other words, the expansion operation is carried out in reverse by gradually collapsing the advance end of the high speed section down to the desired discharge speed, as 5 miles per hour.

If it is desirable to operate the conveyor continuously, then the conveyor belt should be designed as a continuous loop and the collapsed sections are returned to the loading end of the conveyor. If there is need for carrying a return load at high speed, then this run is also provided with conveyor-expanding and conveyor-contracting facilities at the opposite ends of each high speed section of the conveyor and adjacent respective loading and unloading stations.

A typical and illustrative application of the invention conveyor system is as a variable speed traveling sidewalk for pedestrian use. The sidewalk may be of any desired length and as many loading and unloading stations as is desired may be located along either or both runs of the system. Each loading and unloading station is provided with an associated contracting or expanding section in order that the sections of the conveyor passing the associated loading and unloading stations proper may travel at a safe operating speed for passengers entering and leaving the sidewalk. All remaining portions of the conveyor may be operated at a much higher speed, as two to six or more times faster than the slow sections. According to one arrangement of the invention power sidewalk, the entire sidewalk may be virtually at floor level with the return-bend portions carried by sprocket means operating on vertical axes and with the two runs of the conveyor located in closely spaced side-by-side relation and separated by a divider. Cover plates are employed over the slow moving sections at the loading and unloading stations and include suitable comb means for camming the load off the conveyor and onto this cover.

Typically, the conveyor proper may comprise overlapping and intermeshing load-carrying segments interconnected by a linkage assembly of any suitable design having provision for wide range extension and contraction lengthwise of the conveyor and operating under the control of suitable means for expanding or collapsing the linkage according to the particular operating needs.

The linkage assembly may comprise either a single or a multiple linkage assembly preferably but not necessarily arranged in closed endless loops and each consisting basically of a standard type roller link chain. Rigid arm means projecting from the opposite sides of adjacent links have their outer ends bearing against camming means along the slower moving sections of the system to control the expansion and contraction of the linkage while passing these zones. The arms are attached to the links in a manner permitting adjacent arms to internest to achieve maximum speed reduction while passing through the load transfer stations.

If a pair of endless chain assemblies are employed, then these may be arranged to support relatively long, narrow load supporting members in such manner that the lateral edges of these members are substantially in engaging contact with one another throughout both the fast travel zones and throughout a major portion of the slow travel zones. This highly advantageous result is achieved by changing the relative speeds of travel of the two linkages asymetrically, or in out of phase relationship, and by arranging the load bearing members at an acute angle to the path of travel while passing through the fast travel zone. Appropriate means are employed to guide the linkage assemblies into and out of the slow travel zones in such manner as to maintain the load bearing members in side-by-side relation as will as generally at right angles to the direction of travel. For this purpose the slow travel zones of the conveyors are generally U-shaped, each leg being sufficiently long to accommodate loading and unloading and the bight portion of the U being protected by a guard cover. The edges of this cover facing the U-legs are preferably provided with comb means cooperating with grooves extending crosswise of the load bearing members to cam the load onto and off from the conveyor.

(5)

Another feature of the invention is the use of a single mover for driving either a single or a multiple chain linkage from a single drive point. This is feasible in the present system because all parts of the conveyor linkage operate in tension.

Accordingly, it is a primary object of the present invention to provide either an endless or non-endless conveyor system capable of expanding and contracting lengthwise of itself to accommodate operation of different portions of the conveyor at different speeds while passing through different travel zones.

Another object of the invention is the provision of a novel conveyor system having a stretchable load supporting surface with power operated means for simultaneously changing the length of segments of the system to provide a stretched portion traveling at a uniform rate very substantially higher than an unstretched portion.

Another object of the invention is the provision of a conveyor system having an endless stretchable conveyor belt having widely spaced sections thereof operating past respective loading and unloading stations and traveling at a relatively low rate of speed therepast compared to the high rate of travel between loading and unloading stations.

Another object of the invention is the provision of a traveling power-driven sidewalk for pedestrians having long parallel runs provided with either single or multiple pairs of loading and unloading stations along either or both runs together with means for operating the conveyor at a safe operating speed past the loading and unloading stations and at a very substantially higher speed along lengths between stations.

Another object of the invention is the provision of a variable speed conveyor system driven from a single power source operating at uniform speed.

Another object of the invention is the provision of a unique stretchable chain linkage assembly.

Another object of the invention is the provision of a unique conveyor system having stretchable chain linkage assemblies arranged to stretch and contract in out-of-phase relationship to one another while entering and leaving loading stations and while shifting load supporting members lengthwise of one another and maintaining the same closely spaced together.

Another object of the invention is the provision of a multiple speed conveyor system having all portions thereof normally operating under tension and driven from a single prime mover operating normally at a uniform speed.

Another object of the invention is the provision of a power driven conveyor system having different portions operating at different speeds and having a load carrying covering presenting a substantially continuous flat surface whether operating through high speed zones or through the loading and unloading portions of slow speed zones.

Another object of the invention is the provision of a conveyor system operable at different rates through different zones and featuring load bearing members which shift lengthwise relative to one another without material change in the spacing therebetween while changing travel rates between slow and fast travel zones.

Another object of the invention is the provision of a power driven conveyor system having a horizontally supported load carrying surface all portions of which are relatively movable together with power driven means for expanding and contracting the relatively movable segments of a short length of the conveyor at a rate compensating for the substantially different operating speeds to either side of the contracting and expanding means.

Another object of the invention is the provision of a conveyor system utilizing a chain linkage assembly equipped along its opposite sides with lever arm means cooperating with stationary cam surfaces to pivot the linkage between the stretched and contracted conditions thereof as the linkage is being advanced thereby to change the relative speed of advance through different zones along the conveyor.

These and other more specific objects will appear upon reading the following specification and claims and upon considering in connection therewith the attached drawings to which they relate.

Referring now to the drawings in which preferred embodiments of the invention are illustrated.

FIG. 6 is a fragmentary plan view of a second preferred embodiment of my stretchable chain linkage assembly showing the relationship of the components to one another while passing through a loading station;

FIG. 7 is a fragmentary elevational view taken generally along line 7—7 on FIG. 6;

FIG. 8 is a simplified schematic showing one typical arrangement of a conveyor system employing the second embodiment of the stretchable chain linkage assembly with portions operating at typical different speeds while driven from a single prime mover operating at uniform speed;

FIG. 9 is a schematic plan view of a third preferred embodiment of the invention and including a pair of loading and unloading stations;

FIG. 10 is a fragmentary plan view on an enlarged scale of the FIG. 9 embodiment showing one loading station with the cover for the return bend portion of the conveyor detached;

FIG. 11 is a fragmentary view in perspective of a pair of adjacent load bearing members in the position occupied when passing through a loading station;

FIG. 12 is an elevational view as viewed from the left side of FIG. 13;

FIG. 13 is a vertical sectional view taken along line 13—13 on FIG. 12 and showing the comb provided between the moving conveyor and the fixed cover over the return bend of the loading station;

FIG. 14 is a view similar to FIG. 11 but showing the load bearing members shifted lengthwise of one another for travel along a high speed zone; and FIG. 15 is a fragmentary horizontal cross-sectional view on an enlarged scale through one of the chain links of the type used in the second and third embodiments.

Figure 1:
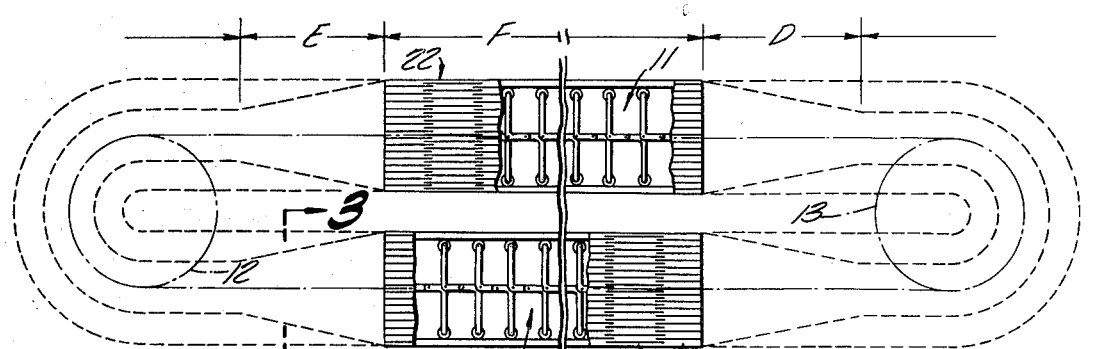
FIG. 1 is a generally schematic plan view of one preferred embodiment of the conveyor system with the major portion of its midsection broken away.
Figure 2:
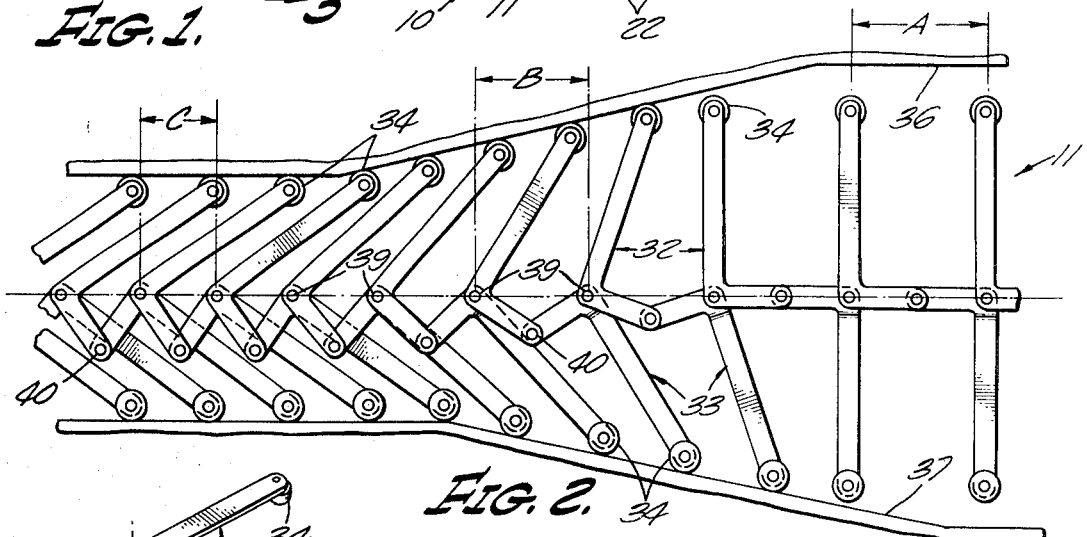
FIG. 2 is an enlarged fragmentary view of one of the conveyor expanding and contracting sections.
Figure 4:
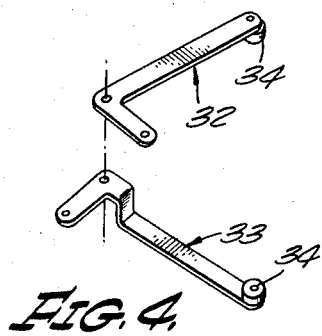
FIG. 4 is an exploded view of a pair of adjacent linkages forming part of the expandable contractable linkage assembly.

Referring initially more particularly to FIGS. 1 and 2, there is shown one preferred embodiment of the invention conveyor system, designated generally 10, having an expandable and contractable linkage 11 entrained over a pair of sprockets 12, 13 driven in synchronism and rotatable about vertical axles supported in suitable bearings, not shown. While the linkage there shown is endless and driven by a single prime mover, not shown, preferably operating at uniform speed, it will be understood that it could be constructed as a linear system operable for a short period in either direction and driven from its downstream end in each instance.

Conveyor 10 operates in a channel 15 (FIG. 3) with its top load-carrying surface generally flush with floor 16. Suitably supported along either side of channel 15 is a guide rail 17 supporting a multiplicity of flanged rollers 18 arranged in pairs at the opposite ends of supporting shafts 19. A U-shaped rigid member 20 carried by shaft 19 is attached to and supports a single one of the conveyor load-carrying segments 22.

Figure 5:
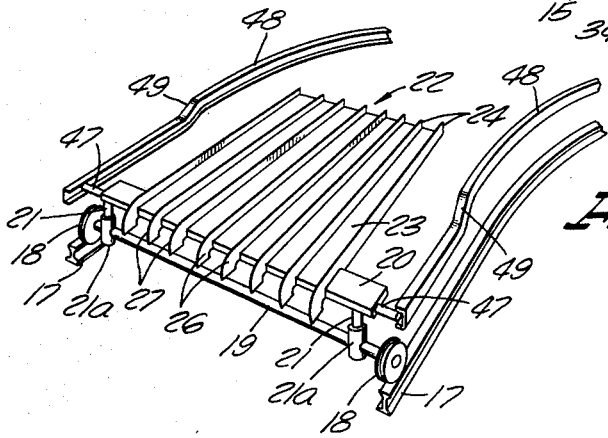
FIG. 5 is a fragmentary perspective view of a single conveyor segment and cam means for separating the segments while negotiating a return bend.

As herein shown by way of example, segments 22 include a sheet metal panel 23 having a plurality of long thin fingers 24 projecting upwardly therefrom and arranged sufficiently close together as to support the load to be carried without risk of any portion of the load entering and becoming jammed between adjacent fingers. For example, if the conveyor is designed to transport pedestrains, then fingers 24 should be close enough to avoid having the heels of ladies' shoes enter between the fingers. However, the fingers must be spaced sufficiently to accommodate internesting of the fingers of an adjacent conveyor segment and to permit the segments to articulate horizontally relative to one another terminating in a generally horizontal plane closely spaced above the trailing end of the adjacent one of segments 22. The rounded upper edges 27 project above the upper edges of fingers 24 of the next adjacent segment in the manner made clear by FIG. 5 and act as a comb underlying the load carried by the conveyor and serving to shift this load to the slight extent necessary to permit lengthwise contraction and expansion of the overlapping ends of adjacent segments 22. Also to be noted from FIG. 5 is the fact one end of each segment is fixed to an inverted U-shaped member 20 having its vertically disposed legs 21 telescoped into tubes 21a welded to shaft 19. The other end of segment 22 rest on shaft 19 and beneath the U-shaped member 20 of the next adjacent segment 22. Secured to the underside of the central portion of the free end of each segment 22 is a journal member 29 having a well 30 the purpose of which will be explained more fully presently.

To aid in camming the load over the overlapping edges of adjacent segments 22, one end 26 of fingers 24 projects downwardly so as to embrace one transverse edge of plate 23 in the manner made clear by FIG. 5 with their lower end edges sufficiently to negotiate the return bend portions of the conveyor.

Figure 3:
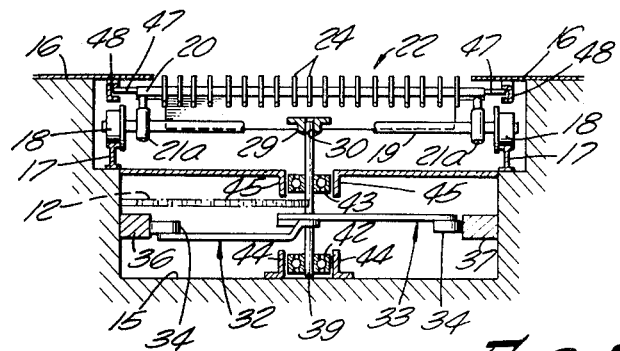
FIG. 3 is a cross-sectional view taken along line 3—3 on FIG. 1.

Referring to FIGS. 3 and 5 it is pointed out the segments 22 also preferably include means for camming the segments to separate fingers 24 of one segment from the comb ends 26 of an adjacent segment while negotiating the return bends thereby avoiding any possibility of damage to the fingers. To this end trunnions 47 projecting from the opposite ends of members 20 extend into channels 48 supported beneath the flooring overlying the segments at the return bend portions of the conveyor system. Along straight portions of the conveyor, channel 48 allows the comb ends 26 of the fingers to extend below the top edges of fingers 24 on the adjacent underlying one of segments 22. However, as the segments approach the return bends, trunnions 47 are cammed upwardly by camming portions 49, 49, formed in channels 48, 48 thereby elevating members 20 and legs 21 relative to tubular seats 21a. The resulting elevation disengages the combs 26 from between the fingers 24 of the underlying segment. Although not shown in FIG. 5, it will be understood that channels 48 are equipped with a second pair of cams similar to cams 49, 49 and positioned at the other end of the return bend and effective to lower the segments back to their normal operating level as they enter the straight run of the conveyor.

One suitable embodiment of linkage assembly 11 comprises a multicity of L-shaped links 32, 33 each including a relatively long leg and a relatively short leg lying generally at right angles to one another. At least one of the longer legs is desirably offset sufficiently to provide operating clearance for reasons self-evident from a consideration of FIGS. 2 and 3. The outer ends of the longer arms are each equipped with a cam follower roller 34 which, under certain operating conditions, are in contact with the faces of cam rails 36, 37 supported along either side wall of channels 15. The spacing between the cam surfaces of rails 36 and 37 varies lengthwise of the conveyor and has important purposes, as will be explained presently.

The L-shaped linkage members 32, 33 have their junction portions arranged in overlapping relation and with their longer arms projecting in opposite directions to either side of the shorter legs, in the manner made clear by FIG. 2. The overlapped junctions of each pair of links are pivotally interconnected by a shaft 39 here shown as projecting vertically from the opposite sides of the linkage members. Split ring keepers or other suitable stop means, not shown, are applied to the midportions of shafts 39 on the remote faces of linkage members 32, 33 to hold them assembled in the midportion of the shafts. As will be observed from FIG. 2, the shorter legs of each pair of linkages 32, 33 also project in opposite directions lengthwise of the conveyor and their outer ends are pivotally connected by pins 40 to the similar ends of an adjacent linkage member.

Each shaft 39 extends downwardly from its links 32, 33, as shown in FIG. 3, and into the channel 15 where it carries a central bearing 43 and a bearing 42 at its end. Bearings 42 and 43 function as guide rollers for shaft 39 and make rolling contact with the adjacent sidewalls of guide channels 44 and 45 formed by brackets carried by walls of channel 15.

Referring now to FIGS. 1 and 2, it will be apparent that so long as the longer legs of linkage members 32, 33 are unrestrained, the application of driving tension from a suitable prime mover to the linkage assembly operates to pivot the shorter legs into alignment with one another longitudinally of the conveyor. The distance between adjacent shafts 39 is then at a maximum and is represented by the arrow A in FIG. 2. However, if the longer legs are pivoted in opposite directions about shafts 39, the shorter legs are likewise pivoted further from alignment causing the shafts to either side of one another to be spaced closer together, as is indicated by arrows B and C in FIG. 2. Further pivoting of the longer arm further reduces the distance between shafts 39 and contracts conveyor segments 22 closer together lengthwise of the conveyor. The degree of expansion or contraction obtainable by this technique is dependent on the relative lengths of the shorter and longer arms of each linkage and the arcs through which the longer arms pivot. When fully expanded, the longer arms approach a position nearly normal to the path of travel. Using this linkage assembly, it is easily possible to operate portions of the conveyor with contraction and expansion ratios ranging between 1 to 2 and 1 to 4 or 5.

Control of expansion and contraction is achieved by cam members 36, 37 arranged along the path of cam follower rollers 34. In the arrangement depicted in FIG. 1 the return bend portions of the conveyor assembly operate with the load-carrying segments 22 contracted to a maximum degree. This is achieved by arranging the control cams 36, 37 in closely spaced parallel relation throughout those portions of the conveyor intended to operate in contracted condition. According to the arrangement shown in FIG. 1, cam guards 36, 37 diverge from one another lengthwise of zones D and E adjacent each return bend with the result that the major length of each run of the conveyor system operates extended and at maximum speed.

Each of the zones D and E constitute reversible contraction and expansion sections for the conveyor linkage 11 and the attached segments 22. Assuming that the conveyor is operating counterclockwise, as the upper run of the conveyor moves to the left, fully contracted segments 22 enter the smaller end of expansion zone D. Simultaneously, advance ones of the expanded segments from the high speed zone F enter the wider inlet end of contraction zone E. Let it be assumed that the power supply, not shown, but understood as connected to main drive sprockets 12, 13 at the opposite ends of the conveyor system, is rotating these sprockets at a uniform rate of five miles per hour. Let it further be assumed that the contraction ratio of linkage assembly 11 is 2 to 1. From these assumptions it follows that all linkages entering the smaller inlet end of expansion zone D are traveling five miles per hour while those leaving the wider exit end of this zone will be going twice as fast, or ten miles per hour. This result necessarily follows from the fact that the diverging cams 36, 37 permits links 32, 33 to pivot toward the aligned positions of their shorter legs. This movement expands the positions of segments 22 within zone D at a rate of five miles per hour which, added to the entrance rate of five miles per hour gives the segments an actual speed of ten miles per hour as they leave the larger end of zone D.

The segments continue to travel at this uniform high speed throughout the length of the expanded section F since there is a continuous supply of segments traveling at this higher speed. As the linkages enter the wider end of contraction zone E, the longer arms are pivoted rearwardly thereby shortening the distance between adjacent shafts 39 and slowing the speed of the conveyor segments traversing zone E. At the exit end of this zone the segments are traveling at slow speed, or five miles per hour, and this is an appropriate location for an unloading station for either goods or pedestrians. Likewise, the portion of the conveyor immediately to the right of expansion zone D is a suitable location for a loading station.

It will be understood that the lower or return run of the conveyor illustrated in FIG. 1 is similarly equipped with associated pairs of loading and unloading stations as well as with pairs of conveyor contraction and expansion zones similar to those just described at D and E. It will likewise be understood that there may be numerous associated pairs of expansion and contraction zones along either run of the conveyor system and located at the opposite ends of a high speed section. The length of the complete system is limited only by the strength of the materials, power requirements and other operating factors.

Although not shown, it will be understood that the return bend portions of the conveyor preferably operate beneath flooring when the system is used as a traveling sidewalk. The exit and entrance end edges of this flooring include suitable comb devices having fingers extending into the space between fingers 24 of the conveyor segments and are effective to cam the load or passengers off the conveyor and onto the flooring as the conveyor passes therebeneath. It is also desirable to provide a separating partition or guard between the two runs of the system.

It is also pointed out that the described expandable-contractable conveyor system is fully reversible and operates equally as well in both directions. This is quite evident from the fact that portions of the linkage assembly traversing the expansion-contraction zones D and E are always operating in opposite directions to one another. In other words, the portion of the linkage undergoing expansion in one zone is paired with another portion of the linkage downstream therefrom which is undergoing the reverse operation.

A second preferred embodiment of the invention, designated generally 10', is disclosed in FIGS. 6 to 8. The chain linkage assembly 50 includes a conventional type of roller chain comprising pairs of links 51 arranged in end-to-end relationship and pivotally interconnected at their overlapping ends. As is best shown in FIGS. 6 and 15, each pair of links is held in parallel spaced relation by spacing rollers, alternate ones 53 of which are of larger diameter than the intervening rollers 54. The larger diameter rollers 53 are engaged in known manner by a sprocket wheel 55 driven by a prime mover 56 (FIG. 8) which may and preferably does operate at uniform speed. It will be understood that the supporting guide rollers located at bends in the conveyor assembly may also comprise either sprocket or non-sprocket type wheels.

Those alternate ones of the pivot pins passing through the smaller diameter rollers 54 project beyond the upper and lower sides of roller chain 50 in the manner best shown in FIG. 7, the lower ends of the pins being equipped with rollers and the upper shouldered ends 59 of the pin being shouldered and socketed in and supporting internesting load supporting members 60 to be described in greater detail presently. Rollers 58 roll along a suitable supporting surface for the conveyor and serve to support the weight of the chain linkage assembly and any load present thereon.

The chain linkage assembly 50, as shown herein by way of example, is provided with rigid arm means for controlling the expanded and contracted condition of the assembly and comprises sets or pairs of rigid arms 63, 64 projecting from the opposite sides of the chain assembly. The inner ends of each set 63, 64 are secured to the chain closely adjacent to the alternate longer ones of the pivot pins 52. The arms comprising set 63, as herein shown, are secured, as by welding, to the exterior faces of one pair of links 51 whereas the pair of arms comprising set 64 are welded to a pair of members 65 (FIGS. 7, 15) straddling the small diameter roller 54 and pivot pin 52 and having their ends welded to an adjacent but separate pair of links 51 from the links to which arms 63 are welded.

The outer ends of each set of arms 63, 64 are provided with rollers 67 for engagement with stationary cam means designated generally 68, 69 suitably supported along either side of the path of travel of the conveyor linkage while passing through other than the fast travel zones. In general, camming surfaces 68, 69 are spaced equidistantly from the opposite sides of the intended path of travel of those pins 52 supporting the smaller diameter rollers 54. It will be understood that the contour of camming surfaces 68, 69 differ from one another in contour and that the two surfaces are staggered or asymmetrical relative to one another lengthwise of the conveyor whereby they coperate to pivot adjacent pairs of chain links 51, 51 in and out of a sawtooth configuration as is best shown in FIG. 6. In this connection it will be observed and understood that the entrance and exit ends of the camming means flare in opposite directions and asymmetrically.

When the sets of arms 63, 64 are secured to the linkage assembly in the manner just described it is feasible to rotate the sets of arms 63, 64 through arcs of nearly 90 degrees the extremes of which include the extended position shown at the opposite ends of FIG. 6 and the contracted position shown in the center of the FIG. 6 wherein the two sets of arms are in closely spaced parallel relation and the lateral edges of links 51, 51 are in substantial contact with one another. When the chain is contracted, the distance between pins 52 corresponds essentially to the width of links 51, whereas under maximum spacing conditions, the links are aligned in their outstretched condition for travel at high speed. If the ratio of the link length to width is 6 to 1, then it follows that the achievable variation in chain speed is in the ratio of 6 to 1. The slowest moving section of the chain is that portion folded or contracted to a maximum degree, as shown in the middle of FIG. 6, whereas the fast traveling section is any section having links in alignment or nearly so, as shown in the sections at the opposite ends of FIG. 6.

It is pointed out that the sets of arms 63, 64 pivot toward one another along the upstream end of the chain as the chain slows while approaching and entering a loading station, whereas the arms pivot away from one another toward their extended position while gaining speed when leaving a loading station. It will be understood that an advance set of arms 64 is controlled or synchronized to operate simultaneously with the adjacent trailing set of arms 63 while passing through a loading station. An understanding of this principle will be best understood by reference to the right hand end of FIG. 6 wherein it will be noted that the outer ends of the upper right hand set of arms 63 will contact camming means 69 after traveling the distance X and that the cooperating set of arms 64 will contact camming means 68 simultaneously after traveling the same distance X. It follows that arms 63 will function to pivot the attached pair of links 51 clockwise simultaneously as arms 64 act to pivot the attached set of links 51 counterclockwise. The importance of having the cam surfaces 68, 69 properly positioned to pivot these two intervening pairs of links 51, 51 in opposite directions simultaneously will be readily appreciated.

Referring now to FIG. 8, there is shown one of the many possible arrangements of the invention variable speed conveyor system arranged in a single closed loop chain link assembly 50. As there shown, the conveyor includes three loading stations 73, 74 and 75 past each of which conveyor operates at a different speed. Thus, the camming means 68, 69 for the respective loading stations are spaced a minimum distance apart at station 73 with the result that the chain passes through the midportion of this station at the rate of 10 feet per minute whereas the midportion of camming means 68, 69 are spaced a greater distance apart at station 74 with the result that the conveyor passes through this station at a minimum speed of 30 feet per minute. At station 75 the camming surfaces 68, 69 are arranged along a curved path with their midportions spaced to provide a minimum speed through this station of 20 feet per minute.

Referring now to FIG. 7, it is pointed out that the typical load supporting members 60 there shown are of modified H-shape in cross-section with lateral pairs of edges spaced to internest with the more widely spaced opposite lateral edge of an adjacent member. If these members are operatively connected to a single chain linkage assembly, this connection is provided between the upper ends of a chain pivot pin 52 and a bracket associated with the midlength of an associated member 60. The opposite ends of the load bearing members may operate within suitable guide channels, as channels 48, 48 shown in FIG. 5. Alternatively, the upper ends of pins 52 may be Y-shaped with each end of a Y arm connected to a single load bearing member 60 to either side of its midlength.

The operation of the second preferred embodiment will be readily apparent from the foregoing detailed description of its components and is generally similar to the operation of the first described embodiment. Thus, portions of the conveyor linkage assembly located between loading stations operates at high speed, as 60 feet per minute, with all links in alignment and the pivot pin 52 spaced a maximum distance apart.

Referring to FIG. 8, it will be readily recognized that as the linkage enters station 73 the sets of arms 63, 64 engage camming surface 68, 69 causing the linkage to contract into the sawtoothed pattern shown in FIG. 6 thereby causing this portion of the assembly to slow down. Since the midportion of the cam surfaces 68, 69 are spaced a minimum distance apart, the conveyor travels at the minimum speed of 10 feet per minute while loading and unloading at station 73. Portions of the chain entering the flaring exit end of this station gradually accelerate and regain speed back to a speed of 60 feet per minute, the rotational speed at which the single driven sprocket 55 is operating. The chain continues to operate at this last travel rate until approaching loading station 74. There, the chain decelerates while entering the left hand end of the camming surfaces 68, 69 but, since the midportions of the camming surfaces at station 74 are spaced further apart than at station 73, the minimum speed of travel through this station is 30 feet per minute. The conveyor again accelerates to its maximum speed as it leaves station 74. Since the midportion of the camming surfaces 68, 69 at station 75 are spaced apart a distance intermediate the spacing at stations 73 and 74, the minimum travel speed at this station is 20 feet per minute. It is pointed out that owing to the flaring disposition of the pair of arms comprising each set 63, 64, the adjacent arms of each set are adapted to nest fully with one another in a manner made clear by FIGS. 6 and 7 when the conveyor is operating at its slowest speed.

Referring now to FIGS. 10 to 15, there is shown a third preferred embodiment of the invention utilizing a pair of the chain linkage assemblies, herein designated 50′, as described above in connection with the second embodiment. Although not shown, it will be understood that camming means 68, 69 are supported along either side of each linkage assembly 50′ at each loading and unloading station.

The closed loop conveyor system shown in FIG. 9 by way of illustrative example includes slow travel sections A, A' connected by intermediate fast travel sections B, B'. Chain assemblies 50' are supported in relatively closely spaced parallel paths along the high speed section B, B' but flare into widely spaced parallel relation at the loading and unloading stations and have the general configuration best shown in FIG. 10. Each loading and unloading station of the conveyor may be appropriately described as generally U-shape in configuration with the legs of the U lying parallel to one another and at an obtuse angle to the length of the related high speed sections B, B'.

The two chain linkages cooperate in supporting the adjacent ends of the long, narrow, closely-spaced load supporting members 60'. Each of these members is provided with brackets 80 (FIG. 11) fixed to its opposite ends having holes insertable over the upper ends of the pivot pins 52 interconnecting the links 51 of the roller chain assemblies. Members 60' remain parallel to one another throughout the length of the conveyor except while negotiating the return bend or bight of each U-shaped portion of the conveyor. During transit of this return bend, members 60' fan out from their adjacent inner ends in the manner clearly illustrated in FIG. 10; throughout all other portions of their travel, members 60' remain immediately adjacent and parallel to one another. Also to be observed from FIG. 10 is the fact that when traveling at high speed members 60' have their ends arranged in echelon. As these members enter and leave the slow travel zones, they shift lengthwise of one another and out of echelon while retaining their closely-spaced parallel relationship. Thus, when traveling at minimum speed, their ends are even with one another. Whereas, when traveling at other than slow speed, their ends are in echelon. Another characteristic aspect of this embodiment is the fact that the load supporting surface of the conveyor is relatively narrow along its high speed portions and relatively wide along its slow speed zones. The inner ends of members 60 continue to travel at slow speed while negotiating the return bend portion of the conveyor whereas the outer ends spread apart and travel at relatively high speed for reasons clearly apparent from FIG. 10.

If the conveyor is employed to handle a load likely to be caught between members 60' then it is desirable that the return bend portion of the conveyor be protected by a cover such as that indicated at 83 to avoid the possibility of passengers or cargo becoming caught between the edge of a member 60 and cover 83. The latter includes a comb 84 along a beveled edge 84 overlying members 60'. Edge 84 includes fingers 85 attached to its underside of V-shape in cross-section and extending downwardly into the complementally shaped V-shaped grooves 86 formed crosswise of the upper surface of the load supporting members 60'. Grooves 86 are aligned while members 60 are passing through the slow speed zone but may be and usually are misaligned while passing from the slow speed into the high speed zone. The misalignment condition is illustrated in FIG. 14 whereas the aligned condition is shown in FIGS. 11 and 12.

Each of the two chain linkage assemblies are suitably supported by rollers from beneath in the manner described in connection with FIG. 7 and by suitable means, such as cog wheels or guide shoes, at the entrances and exits of the loading stations. It will be understood that the slow speed zone along the parallel legs of the loading and unloading stations are sufficiently long for the transfer of either cargo or pedestrian traffic to and from the conveyor. As will be apparent, the slow moving section of one leg of the U-shaped portions serves as an unloading station whereas the corresponding portion of the other leg serves as the loading station.

As in the two previously described embodiments, the third embodiment is preferably driven by a single prime mover connected to drive the two conveyor chains in unison as, for example, from cog wheels mounted on a common shaft. These cog wheels are designed to engage and seat the large diameter rollers 53 of the respective chain assembly. The prime mover can be located either at a slow or high speed section of the conveyor.

The operation of the third embodiment will be quite apparent from the foregoing description of the components and their operative relationship to one another. This species features a simple arrangement of load carrying members arranged in closely spaced side-by-side relation and capable of lengthwise relative movement without variation in the spacing therebetween. The arrangement therefore is characterized by an unusually high safety factor in that there is substantially no opportunity for cargo or pedestrain traffic becoming engaged or pinched between the load bearing members, and this is true even though the chain assembly stretches and contracts over a wide range. The load bearing members cooperate in providing a substantially gapless, continuous level surface throughout the slow and high speed zones. The only time that the spacing between these members varies is while they are negotiating a return bend, an operation which is preferably carried out beneath an overlying cover and with the load out of contact with the moving conveyor.

Throughout the fast travel zone, the load bearing members lie at an acute angle to the length of the two chain assemblies underlying and connected to the load-bearing members. As the members approach a loading station, the two chains supporting the load bearing members pass routed into a slow speed path lying at an obtuse angle to the high speed travel path but remain in their same closely-spaced parallel positions.

While the particular conveyor system with portions operable at different speeds herein shown and disclosed in detail is fully capable of attaining the objects and providing the advantages hereinbefore stated, it is to be understood that it is merely illustrative of the presently preferred embodiments of the invention.

I claim:

1. A conveyor system for use in moving a load along a path including at least one fast travel zone merging at either end with separate slow travel zones, said conveyor system including a pair of endless linkage assemblies constructed and arranged to travel at a relatively fast rate while passing through said fast travel zone and at a relatively slow rate while passing through said slow zones, a multiplicity of long narrow load bearing members movably connected crosswise between said endless linkage assemblies in closely spaced edge-to-edge relation, and means for maintaining said load bearing members closely spaced to one another for a substantial portion of the time of travel through said slow travel zone.

2. A conveyor system as defined in claimed 1 characterized in that said load bearing members lie at an acute angle to the path of travel through said fast travel zone and generally at right angles to the path of travel through said slow travel zone.

3. A conveyor system as defined in claim 1 characterized in that said linkage assemblies include means for supporting the portions thereof in a U-shaped travel path along said slow travel zones with the leg portions thereof lying at an obtuse angle to the fast travel zone.

4. A conveyor system as defined in claim 3 characterized in that said load bearing members lie in close edge-to-edge proximity while passing along the legs of said U-shaped slow travel zones and are widely spaced from one another at one end while passing through the bight of said U-shaped portions.

5. A conveyor system as defined in claim 3 characterized in the provision of cover means closely overlying the bight of said U-shaped slow travel zones and equipped with comb means effective to facilitate the transfer of a load between said cover means and said load bearing means while moving past the edge of said cover means.

6. A conveyor system as defined in claim 5 characterized in that said load bearing members are formed crosswise thereof with aligned V-shaped grooves, and said comb means including fingers projecting from the edge of said cover means downwardly into said V-shaped grooves and providing camming means effective to guide a load between said load bearing members and said cover means.

7. A conveyor system as defined in claim 3 characterized in the provision of a plurality of fast travel zones located one between a pair of associated slow travel zones.

8. A conveyor system as defined in claim 7 characterized in that said U-shaped slow travel zones face in opposite directions and are disposed on the opposite sides of said fast travel zones.

9. A conveyor system as defined in claim 8 characterized in that the legs of each U-shaped slow travel zone are generally parallel to one another.

10. A conveyor system as defined in claim 1 characterized in the provision of a single driving motor for both of said linkage assemblies operating at a generally uniform speed and cooperating with said linkage assemblies to move the same at substantially different rates while portions thereof are passing through said slow and fast travel zones.

11. A conveyor system as defined in claim 4 characterized in the provision of means for moving one end of said load bearing members at a faster rate than the other end thereof while passing through the bight of said U-shaped slow travel zone.

12. A conveyor system as defined in claim 4 characterized in the provision of means for shifting said load bearing members lengthwise of one another while varying the rate of travel thereof along their general path of travel between said slow and fast travel zones.

13. An endless conveyor system comprising means movably supporting a plurality of endless linkage assemblies arranged in laterally spaced relation, drive connection means to said linkage assemblies from a power source, and means located along the path of travel of said linkage assemblies and cooperable therewith as said assemblies are advanced through at least one zone along the path of travel to cause said conveyor system to travel at a substantially different rate than through other zones, and means to cause one of said linkage assemblies to change speed asymmetrically relative to the other of said linkage assemblies when approaching and departing from the opposite ends of said one zone of travel.

14. An endless conveyor system as defined in claim 13 characterized in that said plurality of endless linkage assemblies are driven from a single power source having a single drive connection to all of said linkages.

15. An endless conveyor system as defined in claim 13 characterized in that the means for causing said endless linkage assemblies to travel at different speeds are offset from one another longitudinally of the path of travel through said one zone so that one of said linkage assemblies changes speed in the same direction but in time-delay sequence relative to other of said linkage assemblies as each one thereof enters said one zone.

16. An endless conveyor system as defined in claim 13 characterized in the provision of load supporting members extending crosswise of said linkage assemblies and movably connected to each one thereof for swinging movement in the plane of travel thereof.

17. An endless conveyor system as defined in claim 16 characterized in that said load supporting members are relatively long and narrow with the lateral edges of adjacent members closely spaced to and free to shift in opposite directions longitudinally of one another.

18. On endless conveyor system as defined in claim 17 characterized in that said load supporting members are formed crosswise of their upper surfaces with shallow grooves of V-shaped in cross-section.

19. An endless conveyor system as defined in claim 18 characterized in that said grooves are aligned with one another as said load bearing members pass through a relatively slow speed zone of travel, and comb means having fingers extending downwardly into said V-shaped grooves and effective to guide a load onto and off from said conveyor system.

20. An endless conveyor system as defined in claim 13 characterized in the provision of guide means supporting and guiding major portions of the length of each of said linkage assemblies in relatively closely spaced side-by-side relation and other relatively short portions in widely spaced relation for travel at slow speed relative to the speed of travel of the closely spaced portions of said assemblies.

21. An endless conveyor system as defined in claim 20 characterized in that said guide means for relatively slowly moving portion of said linkage assemblies are generally U-shaped as viewed from a point above said conveyor system and offset to one side of the adjacent relatively high speed portions of said conveyor system.

22. An endless conveyor system as defined in claim 21 characterized in that said system includes a plurality of said U-shaped slow speed portions with adjacent ones of said U-shaped being positioned on the opposite sides of intervening relatively high speed portions thereof.

23. An endless conveyor system as defined in claim 22 characterized in the provision of load supporting means supported in closely spaced relation above said U-shaped slow moving portions of said conveyor means and supported independently of said power driven linkage assemblies, and transition means to aid the transfer of loads between the load supporting means moving with said linkage assemblies and the load supporting means directly above said U-shaped slow-moving portions of the conveyor system.

24. An endless conveyor system as defined in claim 17 characterized in that said load supporting members are shaped to internest loosely within one another laterally thereof.

25. An endless conveyor system as defined in claim 13 characterized in the provision of means for changing the speed of one linkage assembly slightly prior to similarly changing the speed of another linkage and for then advancing the two portions at the same speed before changing the speed of both portions back to the former speed.

26. An endless conveyor system as defined in claim 25 characterized in that said chain links and the arms rigidly fixed thereto are proportioned to provide for relative rates of travel of the faster and slower traveling sections thereof in a ratio not less than three to one.

27. An endless conveyor system as defined in claim 13 characterized in that said linkage assemblies each include a roller link chain, a rigid arm fixed to the adjacent ends of alternate pairs of the links of said chain and projecting laterally from the opposite sides of said chain with their outer free ends positioned to engage cammed guide means effective to pivot said arms and links laterally relative to the line of travel of said roller link chain thereby to change the effective length of said chain and the relative rates of travel of relatively long and relatively short adjacent sections thereof.

28. An endless conveyor system as defined in claim 27 characterized in that said camming means for said rigid arms are positioned to swing said arms toward one another and counter to the direction of advance of said linkage assemblies to shorten a portion of the linkage assembly thereby to decrease the rate of travel of the shortened portion.

29. An endless conveyor system as defined in claim 27 characterized in that the upstream end of said camming means for said rigid arms flares outwardly away from the opposite sides of said linkage thereby allowing said rigid arms to pivot away from one another and from said linkage as the latter links resume their higher rate of travel.

30. An endless conveyor system as defined in claim 13 characterized in the provision of a pair of said linkage assemblies each supported in relatively closely spaced parallel relation through a major portion of their lengths and interconnected at their adjacent opposite ends by U-shaped return bend portions offset on the opposite sides of the intervening closely spaced parallel portions thereof.

31. An endless conveyor system as defined in claim 30 characterized in that the return bend portions of said linkage assemblies are relatively widely spaced and in generally arcuate parallel relationship to one another, and means cooperating with said linkage assemblies at said return bend portions to slow the rate of travel of said linkage assemblies while negotiating the return bend portions of said conveyor system.

32. A conveyor system having a pair of independent linkage assemblies each provided with means for pivoting adjacent pairs of links thereof toward and away from the straight aligned condition thereof to vary the relative rates of travel of adjacent portions of said linkage assemblies depending on whether the aligned condition of the links of one portion is being changed relative to other portion, means for driving both linkage assemblies at the same speed, a multiplicity of rigid means movably interconnecting said linkage assemblies transversely thereof, and means for progressively changing the length of said linkage assemblies in slightly out of phase relationship as the same advance past a selected point in the path of travel to change the rate of travel thereof and while skewing said rigid means relative to one another and to the path of travel.

33. A conveyor system as defined in claim 31 characterized in that said means for progressively changing the length of said linkage assemblies comprises fixed cam means disposed on the opposite sides of each linkage assembly having oppositely flaring ends and an elongated narrow throat portion interconnecting said flaring ends, and cooperating cam arms carried along the opposite sides of said linkage assemblies and bearing outwardly against the inwardly facing surfaces of said fixed cam means and cooperating therewith to vary the rate of travel of portions of said linkage assemblies as they enter into and exit from the flaring ends of said fixed cam means.

34. A conveyor system as defined in claim 33 characterized in that the flaring opposite ends of said fixed cam means are skewed oppositely to one another.

References Cited

UNITED STATES PATENTS

| | | | |
|---|---|---|---|
| 2,330,058 | 9/1943 | Keller | 74—245 |
| 2,589,887 | 3/1952 | Sprague | 74—245 |
| 3,162,297 | 12/1964 | Leach | 198—110 |
| 3,292,769 | 12/1966 | Zuppiger | 198—110 |
| 3,352,250 | 11/1967 | Bouladon et al. | 104—25 |

FOREIGN PATENTS

| | | |
|---|---|---|
| 624,607 | 1/1963 | Belgium. |
| 1,127,433 | 9/1968 | Great Britain. |

ANDREW H. FARRELL, Primary Examiner